United States Patent
Moon et al.

(10) Patent No.: US 9,368,282 B2
(45) Date of Patent: Jun. 14, 2016

(54) MULTILAYER CERAMIC CAPACITOR, MANUFACTURING METHOD THEREOF, AND BOARD HAVING THE SAME MOUNTED THEREON

(71) Applicant: SAMSUNG ELECTRO-MECHANICS CO., LTD., Suwon, Gyunggi-do (KR)

(72) Inventors: Je Ik Moon, Gyunggi-do (KR); Byoung Jin Chun, Gyunggi-do (KR); Hang Kyu Cho, Gyunggi-do (KR); Jae Hwan Han, Gyunggi-do (KR)

(73) Assignee: SAMSUNG ELECTRO-MECHANICS CO., LTD., Suwon-Gyunggi-Do (KR)

( * ) Notice: Subject to any disclaimer, the term of this patent is extended or adjusted under 35 U.S.C. 154(b) by 199 days.

(21) Appl. No.: 14/140,276

(22) Filed: Dec. 24, 2013

(65) Prior Publication Data

US 2015/0090483 A1  Apr. 2, 2015

(30) Foreign Application Priority Data

Sep. 30, 2013 (KR) .................. 10-2013-0116566

(51) Int. Cl.
*H01G 4/30* (2006.01)
*H01G 4/232* (2006.01)
*H01G 2/06* (2006.01)

(52) U.S. Cl.
CPC . *H01G 4/30* (2013.01); *H01G 2/06* (2013.01); *H01G 4/232* (2013.01); *H01G 4/2325* (2013.01); *Y10T 29/435* (2015.01)

(58) Field of Classification Search
CPC ............................................. H01G 4/00–4/248
See application file for complete search history.

(56) References Cited

U.S. PATENT DOCUMENTS

| | | | | |
|---|---|---|---|---|
| 6,381,117 B1* | 4/2002 | Nakagawa | ............... | H01G 2/14 361/301.4 |
| 2001/0055704 A1* | 12/2001 | Hosokura | ............... | B32B 18/00 428/699 |
| 2009/0002920 A1* | 1/2009 | Itamura | ............... | H01G 4/2325 361/321.3 |

(Continued)

FOREIGN PATENT DOCUMENTS

| JP | 05-144666 | 6/1993 |
|---|---|---|
| JP | 05-343256 | 12/1993 |
| KR | 10-2005-0102767 A | 10/2005 |

OTHER PUBLICATIONS

Tyco Electronics, "Keeping Tin Solderable", p. 2—Intermediate Growth first paragraph, http://ww.te.com/documentation/whitepapers/pdf/Keeping_Tin_Solderable.pdf.*

(Continued)

*Primary Examiner* — Jeremy C Norris
*Assistant Examiner* — Muhammed Azam
(74) *Attorney, Agent, or Firm* — McDermott Will & Emery LLP

(57) ABSTRACT

A multilayer ceramic capacitor includes a ceramic body including dielectric layers and internal electrodes; an electrode layer disposed on an outer surface of the ceramic body and electrically connected to the internal electrodes; a first composite resin layer disposed on the electrode layer and including a first conductive powder; and a second composite resin layer disposed on the first composite resin layer and including a second conductive powder different from the first conductive powder.

12 Claims, 6 Drawing Sheets

(56) References Cited

U.S. PATENT DOCUMENTS

2011/0157767 A1* 6/2011 Hur .................. H01G 4/008
                                                    361/305
2014/0043724 A1* 2/2014 Kang ................. H01G 4/30
                                                    361/321.2

OTHER PUBLICATIONS

Tyco Electronics/Wayback Machine, Tin nickel (intermetallic) (date), May 14, 2013.*

* cited by examiner

MULTILAYER CERAMIC CAPACITOR, MANUFACTURING METHOD THEREOF, AND BOARD HAVING THE SAME MOUNTED THEREON

CROSS-REFERENCE TO RELATED APPLICATION

This application claims the benefit of Korean Patent Application No. 10-2013-0116566 filed on Sep. 30, 2013, with the Korean Intellectual Property Office, the disclosure of which is incorporated herein by reference.

BACKGROUND

The present disclosure relates to a multilayer ceramic capacitor, a manufacturing method thereof, and a board having the same mounted thereon.

A multilayer ceramic capacitor among ceramic electronic components includes a plurality of stacked dielectric layers, internal electrodes disposed to face each other, having the dielectric layer interposed therebetween, and external electrodes electrically connected to the internal electrodes.

Multilayer ceramic capacitors have been widely used as components for mobile communications devices such as computers, personal digital assistances (PDAs), mobile phones, or the like, due to advantages thereof such as a small size, high capacitance, and easiness of mounting.

Recently, as electronic products are miniaturized and multi-functionalized, chip components also tend to be miniaturized and multi-functionalized. As a result, there is a need to miniaturize the size of the multilayer ceramic capacitor and increase capacitance thereof.

To this end, a multilayer ceramic capacitor, in which the number of stacked dielectric layers is increased through the dielectric layers and internal electrodes having decreased thicknesses and on the exterior of which external electrodes have also been thinned, has been manufactured.

In addition, as many functions in devices requiring high reliability, such as vehicle control systems or medical devices, are digitized and demand therefor increases, multilayer ceramic capacitors are also required to have high reliability in order to meet the demands above.

Causes of reliability problems may include plating solution permeation occurring during a plating process, cracking due to external shocks, and the like.

Therefore, as a method for solving such problems, a resin composition containing a conductive material may be applied between an electrode layer of an external electrode and a plated layer thereof, to absorb external shocks and prevent plating solution permeation, thereby improving product reliability.

However, in the case in which such a conductive resin layer is provided between the electrode layer of the external electrode and the plated layer thereof, an interface separation phenomenon may be caused between the electrode layer and the conductive resin layer or between the conductive resin layer and the plated layer. Particularly, this interface separation is frequently caused during a process of mounting the multilayer ceramic capacitor on a board, thereby degrading reliability thereof.

In addition, in order to apply multilayer ceramic capacitors to a product group required to meet a certain standard, requiring high reliability, such as vehicles and high voltage products, multilayer ceramic capacitors having relatively high reliability are demanded. Therefore, there is a need for a multilayer ceramic capacitor having high reliability by reducing the interface separation phenomenon between the conductive resin layer and the plated layer.

RELATED ART DOCUMENT (Patent Document 1) Korean Patent No. 10-0586962

SUMMARY

An aspect of the present disclosure may provide a multilayer ceramic capacitor in which an interface separation between layers of an external electrode is significantly reduced, a manufacturing method thereof, and a board having the same mounted thereon.

According to an aspect of the present disclosure, a multilayer ceramic capacitor may include: a ceramic body including dielectric layers and internal electrodes; an electrode layer disposed on an outer surface of the ceramic body and electrically connected to the internal electrodes; a first composite resin layer disposed on the electrode layer and including a first conductive powder; and a second composite resin layer disposed on the first composite resin layer and including a second conductive powder different from the first conductive powder.

The first conductive powder may include at least one of copper (Cu) and silver (Ag).

The second conductive powder may include nickel (Ni).

The first composite resin layer and the second composite resin layer may further include a thermosetting resin.

The thermosetting resin may include an epoxy resin.

The multilayer ceramic capacitor may further include a plated layer formed on the second composite resin layer.

The plated layer may include tin (Sn).

The multilayer ceramic capacitor may further include an intermetallic compound formed in a region in which the second composite resin layer and the plated layer contact.

The intermetallic compound may be formed by a reaction between the second conductive powder and a metal included in the plated layer.

The intermetallic compound may have a thickness of 1 nm to 8 nm.

According to another aspect of the present disclosure, a method of manufacturing a multilayer ceramic capacitor may include: preparing a plurality of ceramic green sheets; forming internal electrode patterns on the ceramic green sheets; forming a ceramic body including dielectric layers and internal electrodes by stacking and sintering the ceramic green sheets having internal electrode patterns formed thereon; forming an electrode layer on an outer surface of the ceramic body to be electrically connected to the internal electrodes; applying a first composite resin paste including a first conductive powder to the electrode layer; applying a second composite resin paste including a second conductive powder to the first composite resin paste; and forming a first composite resin layer and a second composite resin layer by curing the first composite resin paste and the second composite resin paste.

According to another aspect of the present disclosure, a board having a multilayer ceramic capacitor mounted thereon may include: a printed circuit board having first and second electrode pads disposed thereon; and a multilayer ceramic capacitor mounted on the printed circuit board, wherein the multilayer ceramic capacitor includes a ceramic body including dielectric layers and internal electrodes, an electrode layer disposed on an outer surface of the ceramic body and electrically connected to the internal electrodes, a first composite resin layer disposed on the electrode layer and including a first conductive powder, and a second composite resin layer disposed on the first composite resin layer and including a second conductive powder different from the first conductive powder.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
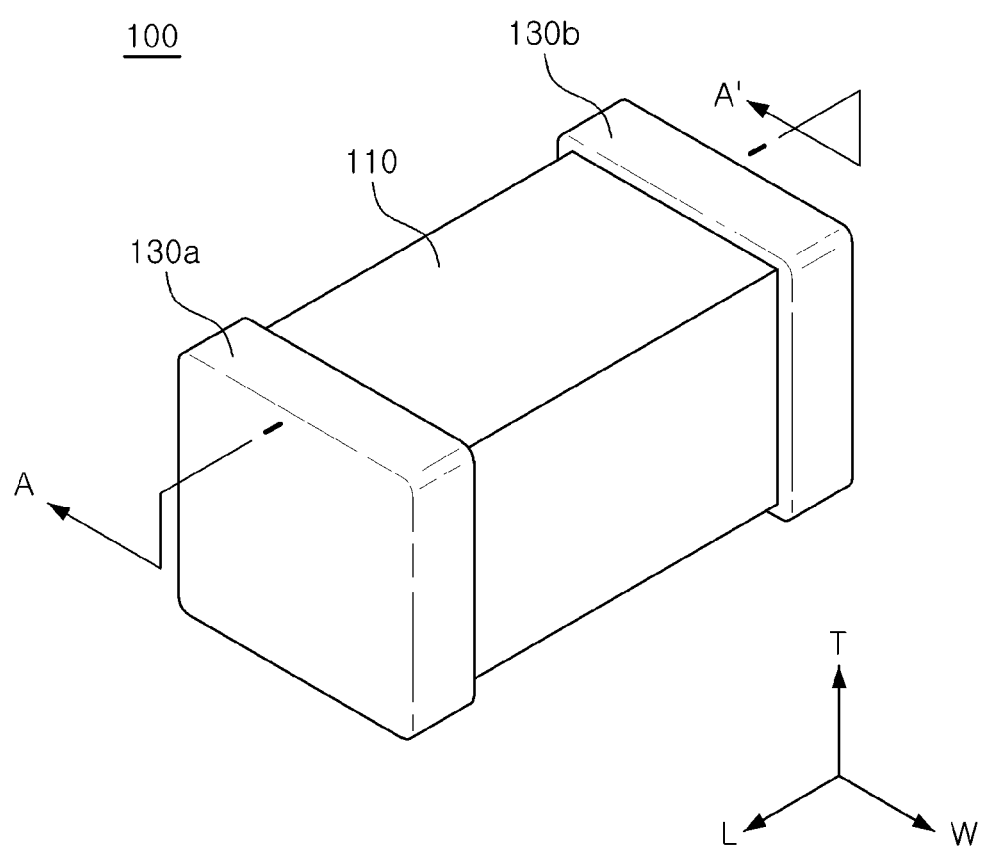
FIG. 1 is a perspective view illustrating a multilayer ceramic capacitor according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Multilayer Ceramic Capacitor

Figure 2:
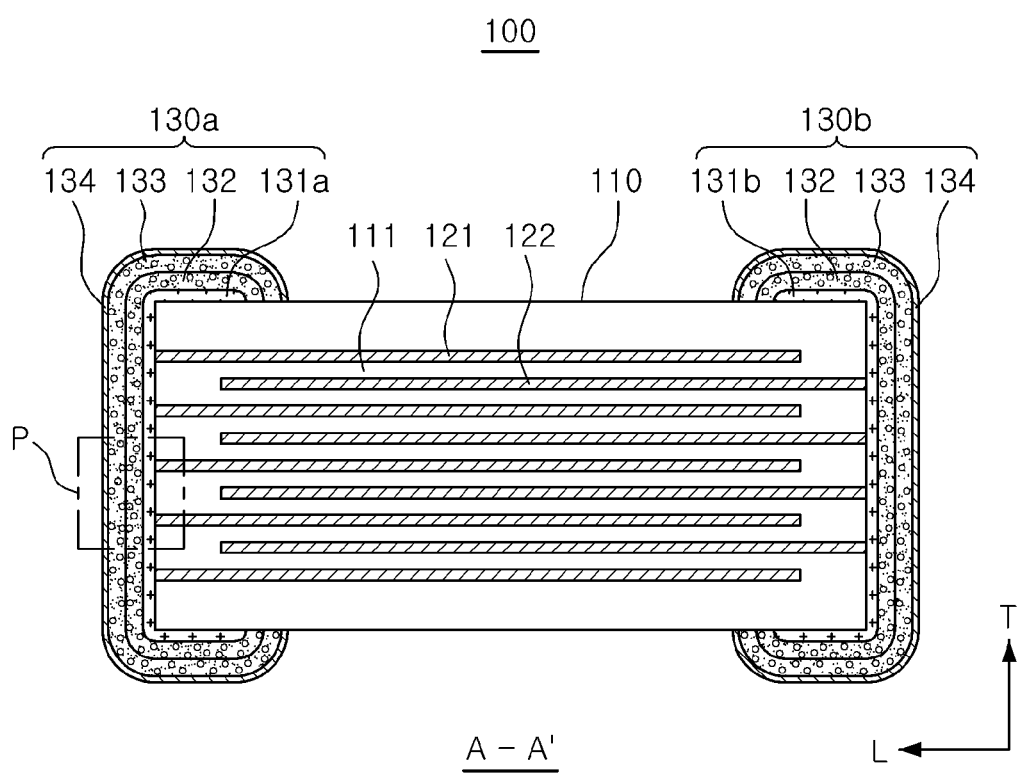
FIG. 2 is a cross-sectional view taken along line A-A' of FIG. 1.

FIG. 1 is a perspective view showing a multilayer ceramic capacitor according to an exemplary embodiment of the present disclosure, and FIG. 2 is a cross-sectional view taken along line A-A' of FIG. 1.

Figure 3:
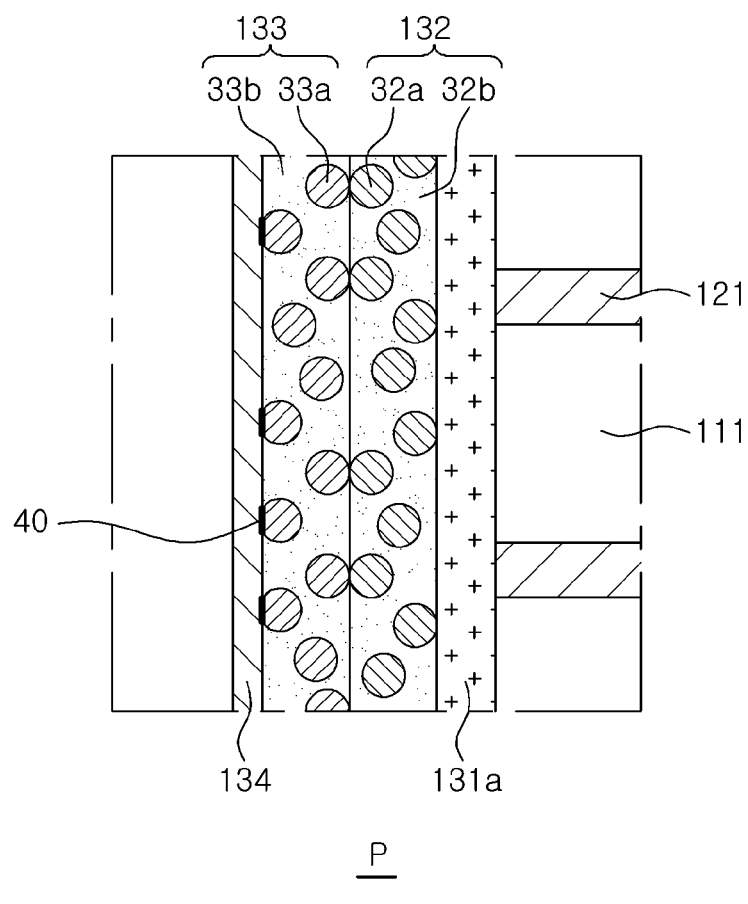
FIG. 3 is an enlarged view of region P of FIG. 2.

FIG. 3 is an enlarged view of region P of FIG. 2.

Referring to FIGS. 1 and 2, a multilayer ceramic capacitor 100 according to the exemplary embodiment of the present disclosure may include a ceramic body 110 and external electrodes 130a and 130b.

The ceramic body 110 may include an active layer as a capacitance forming portion contributing to formation of capacitance, and upper and lower cover layers formed on and below the active layer as upper and lower margin portions. The active layer may include dielectric layers 111 and first and second internal electrodes 121 and 122.

In the exemplary embodiment of the present disclosure, a shape of the ceramic body 110 is not particularly limited, but may be substantially hexahedral. The ceramic body 110 may not have a perfectly hexahedral shape, but may have a shape substantially similar to a hexahedron, due to sintering shrinkage of a ceramic powder at the time of a sintering process of a chip, a thickness difference according to existence and inexistence of an internal electrode pattern, and a polishing process of corner portions of the ceramic body.

A direction of a hexahedron will be defined in order to clearly describe embodiments of the present disclosure. L, W and T shown in the drawings refer to a length direction, a width direction, and a thickness direction, respectively. Here, the thickness direction may be the same as a stacking direction in which dielectric layers are stacked.

The internal electrodes are configured of the first internal electrodes 121 and the second internal electrodes 122, and the first and second internal electrodes may be disposed to face each other, having the dielectric layer 111 interposed therebetween. The first and second internal electrodes 121 and 122, a pair of electrodes having different polarities, may be formed by printing a conductive paste including a conductive metal on the dielectric layers 111 at a predetermined thickness. The pair of first and second internal electrodes 121 and 122 may be alternately exposed to both end surfaces of the ceramic body and may be electrically insulated from each other by the dielectric layer 111 disposed therebetween.

That is, the first and second internal electrodes 121 and 122 may be electrically connected to the external electrodes 130a and 130b through portions thereof alternately exposed to both end surfaces of the ceramic body 110. More specifically, the external electrodes may include the first and second external electrodes 130a and 130b, and the first internal electrodes 121 may be electrically connected to the first external electrode 130a, and the second internal electrodes 122 may be electrically connected to the second external electrode 130b.

Therefore, when voltage is applied to the first and second external electrodes 130a and 130b, charges are accumulated between the first and second internal electrodes 121 and 122 facing each other. In this case, a capacitance of the multilayer ceramic capacitor 100 is proportional to an area of a region in which the first and second internal electrodes 121 and 122 are overlapped with each other.

A thickness of the first and second internal electrodes 121 and 122 may be determined depending on intended use.

In addition, the conductive metal included in the first and second internal electrodes 121 and 122 may be nickel (Ni), copper (Cu), palladium (Pd), or an alloy thereof, but is not limited thereto.

In this case, the thickness of the dielectric layer 111 may be arbitrarily changed according to a target capacitance of the multilayer ceramic capacitor.

In addition, the dielectric layer 111 may include a ceramic powder having high permittivity, for example, a barium titanate ($BaTiO_3$) based powder or a strontium titanate ($SrTiO_3$) based powder, but is not limited thereto.

The upper and lower cover layers may have the same material and configuration as those of the dielectric layers 111, except that they do not include the internal electrodes. The upper and lower cover layers may be formed by vertically stacking a single dielectric layer or two or more dielectric layers on respective upper and lower surfaces of the active layer, and may serve to prevent the first and second internal electrodes 121 and 122 from being damaged by physical or chemical stress.

The first external electrode 130a may include a first electrode layer 131a, a first composite resin layer 132, and a second composite resin layer 133, and the second external electrode 130b may include a second electrode layer 131b, the first composite resin layer 132, and the second composite resin layer 133.

The first and second electrode layers 131a and 131b are directly connected to the first and second internal electrodes 121 and 122 to thereby secure electrical conduction between the external electrodes and the internal electrodes.

The first and second electrode layers 131a and 131b may include a conductive metal, and the conductive metal may be nickel (Ni), copper (Cu), palladium (Pd), gold (Au), or an alloy thereof, but is not limited thereto.

The first and second electrode layers 131a and 131b may be formed by firing a paste including the conductive metal.

The first composite resin layer 132 may be disposed on the first and second electrode layers 131a and 131b, and the second composite resin layer 133 may be formed on the first composite resin layer 132.

That is, the first and second electrode layers are disposed on an outer surface of the ceramic body, the first composite resin layer may be disposed at an outer side of the first and second electrode layers, and the second composite resin layer may be disposed at an outer side of the first composite resin layer.

Throughout the specification, with respect to the external electrode, an inner side refers to a direction in which the ceramic body 110 is present, and an outer side refers to a direction in which the ceramic body 110 is not present.

FIG. 3 is an enlarged view of region P of FIG. 2. As shown in FIG. 3, the first composite resin layer 132 may include a first conductive powder 32a and a base resin 32b, and the first conductive powder 32a may include at least one of copper (Cu), silver (Ag), and alloys thereof.

The base resin 32b may include a thermosetting resin. The thermosetting resin may be an epoxy resin, but is not limited thereto.

As described above, the second composite resin layer 133 including a second conductive powder 33a and a base resin 33b may be disposed at the outer side of the first composite resin layer 132.

The second conductive powder 33a may be different from the first conductive powder 32a, and the second conductive powder may include nickel (Ni).

In addition, the base resin 33b may include a thermosetting resin, and the thermosetting resin may be an epoxy resin, but is not limited thereto.

Further, the base resin 33b included in the second composite resin layer 133 and the base resin 32b included in the first composite resin layer 132 may be the same as each other, but are not limited thereto, and the first and second composite resin layers may include different resin materials.

In the case in which the first and second electrode layers are formed by firing the paste including an electrical conductive metal, the first and second electrode layers may not alleviate the impact of external shocks due to having a high degree of hardness and may suffer from cracking or the like when external impacts are applied thereto. That is, due to the high hardness of the first and second electrode layers, warpage strength characteristics are not high. Therefore, in order to improve the warpage strength characteristics of the multilayer ceramic capacitor, the composite resin layer may be formed on the first and second electrode layers. According to the present embodiment, the composite resin layer may include the first composite resin layer and the second composite resin layer.

The first conductive powder 32a of the first composite resin layer 132 may include at least one of silver (Ag) and copper (Cu) having high electrical conductivity in order to improve electrical conduction with the electrode layer, and the second conductive powder 33a of the second composite resin layer 133 may include nickel (Ni) in order to improve bonding force with a solder including tin (Sn) or a plated layer including tin (Sn).

Since copper (Cu) or silver (Ag) has low bonding force with tin (Sn), in the case in which a metal forming an outermost portion of the external electrode includes at least one of copper and silver, adhesion between the external electrode and the solder is low at the time of mounting the multilayer ceramic capacitor on a board, whereby a mounting defect may be caused. Therefore, a method of improving adhesion between the external electrode and the solder by disposing a plated layer including tin (Sn) on the outermost portion of the external electrode is generally used.

However, when a tin plated layer is immediately formed on the external electrode including at least one of copper and silver, a solder paste may not climb the external electrode at the time of soldering.

That is, in the case in which the tin plated layer is immediately formed on the first composite resin layer made of the conductive powder including at least one of copper (Cu) and silver (Ag), although the tin plated layer is disposed at the outermost side of the external electrode, the tin plated layer directly contacts copper or silver and reacts therewith, such that the solder may not climb the external electrode and may flow down at the time of mounting the multilayer ceramic capacitor on the board. In this case, adhesion therebetween is low, resulting in the mounting defect.

In addition, in the case in which the tin plated layer is immediately formed on the first composite resin layer, the first composite resin layer may be partially plated.

Therefore, in the case in which a nickel layer having excellent bonding force with all of copper, silver, and tin is disposed on the first composite resin layer 132 as a buffer layer, the above-mentioned problem may be solved.

However, in the case in which the nickel layer is formed on the first composite resin layer by a plating method, interface separation (delamination) between the first electrode layer and the first composite resin layer or between the second electrode layer and the first composite resin layer may be caused due to strong bonding force between the nickel plated layer and the first composite resin layer.

That is, in the case in which the nickel plated layer is formed on the first composite resin layer, bonding force between the first conductive metal included in the first composite resin layer and the nickel plated layer may be excessively strong, as compared to bonding force between the first and second electrode layers and the first composite resin layer, such that stress generated during the plating process may be generated inside the external electrode and may weaken interface adhesion between the first and second electrode layers and the first composite resin layer, thereby causing the interface separation between the first and second electrode layers and the first composite resin layer.

However, in the case in which the resin layer including a nickel powder, that is, the second composite resin layer 133 is formed on the first composite resin layer 132 as in the exemplary embodiment of the present disclosure, the easiness of soldering may be secured, whereby a mounting defect rate may be decreased and the delamination caused between the first and second electrode layers and the first composite resin layer may be solved.

That is, in the case in which the nickel plated layer is not formed on the first composite resin layer and the second composite resin layer including the second conductive metal including nickel and the base resin is formed on the first composite resin layer, the electrical conduction may be realized by contact between the first conductive metal included in the first composite resin layer and the second conductive metal included in the second composite resin layer, such that excessively strong physical bonding is not formed between the first composite resin layer and nickel, and the composite resin layer including the nickel powder and the base resin, instead of a plated layer having a high degree of hardness, is provided and the base resin included in the second composite resin layer absorbs the stress, whereby an interface separation phenomenon between the first and second electrode layers and the first composite resin layer may be decreased.

In addition, since the second composite resin layer includes nickel, even in the case in which the external electrode does not include a separate plated layer, the multilayer ceramic capacitor may be mounted on the board using a solder including tin.

Further, nickel plating wastewater generated in a nickel plating process may be decreased, such that environmental friendliness may be improved.

Further, a plated layer 134 may be formed on the second composite resin layer 133 in order to further improve adhesion with the solder, and the plated layer 134 may include tin.

An intermetallic compound 40 formed by reaction between the second conductive metal and tin may be formed between the second composite resin layer 133 and the tin plated layer 134.

That is, the intermetallic compound 40 may be formed in a region in which the second composite resin layer and the plated layer contact, more specifically, a region in which the second conductive metal included in the second composite resin layer and the plated layer contact.

The intermetallic compound may enhance adhesion between the second composite resin layer and the plated layer, whereby a multilayer ceramic capacitor resistant to thermal shock may be provided.

The intermetallic compound may have a thickness of 1 nm to 8 nm. In the case in which the thickness of the intermetallic compound is below 1 nm, a level of adhesion between the second composite resin layer and the plated layer is similar to a level of adhesion secured by the thermosetting resin included in the composite resin layer, such that additional adhesion may not be formed, resulting in the interface separation between the second composite resin layer and the plated layer.

In addition, in the case in which the thickness of the intermetallic compound exceeds 8 nm, stress by the plated layer may be accumulated on the second composite resin layer due to the intermetallic compound, such that the interface separation may be caused between the first and second electrode layers and the first composite resin layer.

Therefore, in order to solve both the interface separation between the first and second electrode layers and the first composite resin layer and the interface separation between the second composite resin layer and the plated layer, the intermetallic compound may be formed to have the thickness of 1 nm to 8 nm.

Method of Manufacturing Multilayer Ceramic Capacitor

Figure 4:
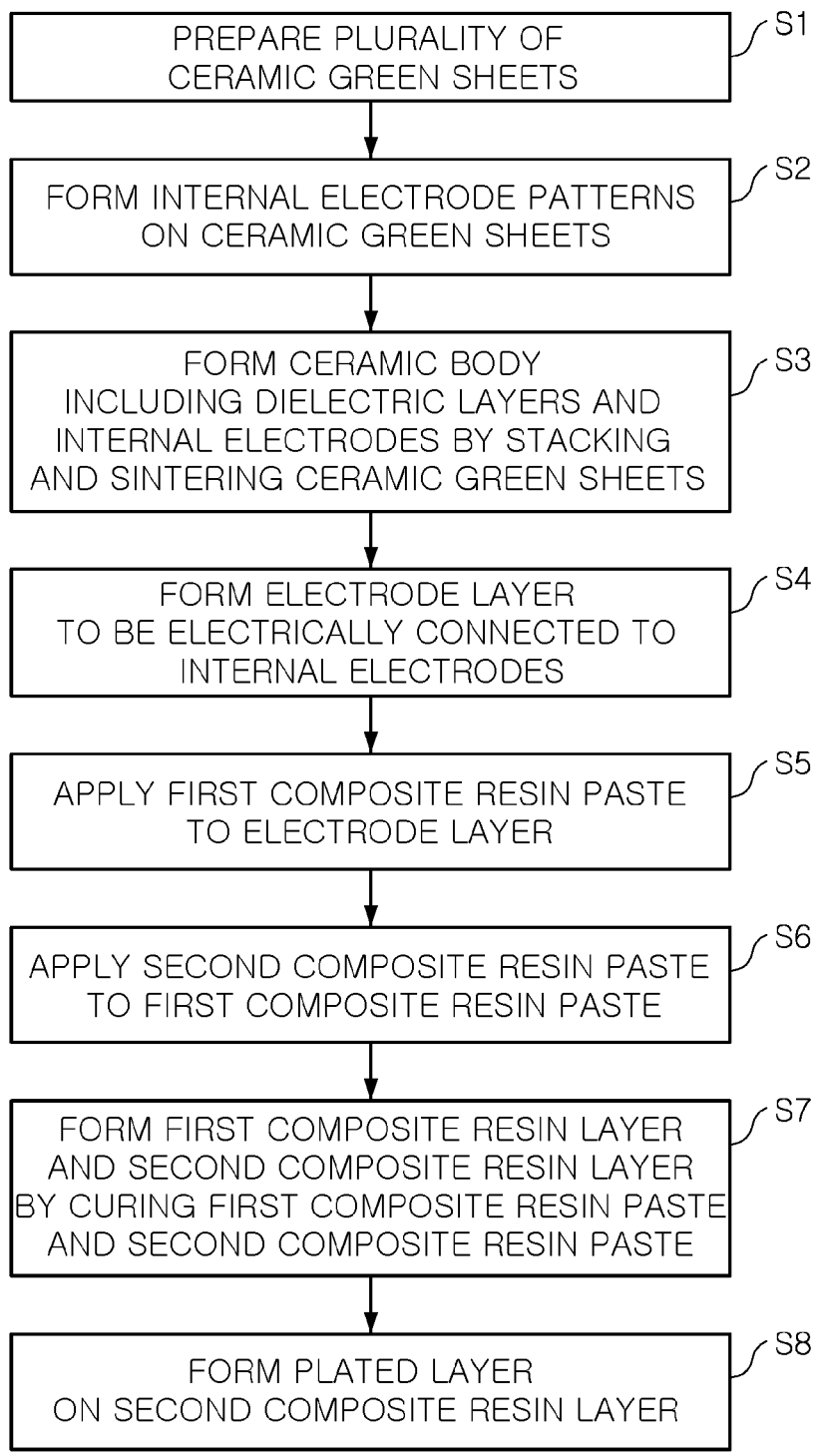
FIG. 4 is a flowchart illustrating a method of manufacturing a multilayer ceramic capacitor according to another exemplary embodiment of the present disclosure.

FIG. 4 is a flowchart showing a method of manufacturing a multilayer ceramic capacitor according to another exemplary embodiment of the present disclosure.

Referring to FIG. 4, a method of manufacturing a multilayer ceramic capacitor according to the present embodiment may include preparing a plurality of ceramic green sheets (S1); forming internal electrode patterns on the ceramic green sheets (S2); forming a ceramic body including dielectric layers and internal electrodes by stacking and sintering the ceramic green sheets having the internal electrode patterns formed thereon (S3); forming an electrode layer on an outer surface of the ceramic body to be electrically connected to the internal electrodes (S4); applying a first composite resin paste including a first conductive powder to the electrode layer (S5); applying a second composite resin paste including a second conductive powder to the first composite resin paste (S6); and curing the first composite resin paste and the second composite resin paste to thereby form a first composite resin layer and a second composite resin layer (S7).

Details of the method of manufacturing a multilayer ceramic capacitor according to the present embodiment, overlapped with those of the multilayer ceramic capacitor according to the above-described embodiment, will be omitted.

In the method of manufacturing a multilayer ceramic capacitor according to the exemplary embodiment of the present disclosure, a slurry containing a powder such as a barium titanate ($BaTiO_3$), or the like, may be applied to carrier films and dried to prepare a plurality of ceramic green sheets, thereby forming dielectric layers and cover layers.

The ceramic green sheets may be obtained by preparing the slurry by mixing the ceramic powder, a binder, and a solvent and manufacturing the slurry as sheets having a thickness of several μm by a doctor blade method.

Next, a conductive paste for internal electrodes including a metal powder may be prepared.

After the conductive paste for internal electrodes is applied to the green sheets by a screen printing method to thereby form internal electrodes, the plurality of green sheets having the internal electrodes printed thereon may be stacked to form a multilayer body, and a plurality of green sheets having no internal electrode printed thereon may be stacked on upper and lower surfaces of the multilayer body, and they may be then sintered, such that the ceramic body 110 may be manufactured. The ceramic body 110 may include the internal electrodes 121 and 122, the dielectric layers 111, and the cover layers. Here, the dielectric layers are formed by sintering the green sheets having the internal electrodes printed thereon, and the cover layers are formed by sintering the green sheets having no internal electrode printed thereon.

The internal electrodes may be formed of first and second internal electrodes.

The first and second electrode layers 131 and 131b may be formed on an outer surface of the ceramic body to be electrically connected to the first and second internal electrodes, respectively. The first and second electrode layers may be formed by sintering a paste including a conductive metal and glass.

The conductive metal is not particularly limited, but may be at least one selected from a group consisting of copper (Cu), silver (Ag), nickel (Ni), and alloys thereof. As described above, copper (Cu) may be preferably used as the conductive metal.

The glass is not particularly limited, but a material having the same composition as that of glass used for manufacturing external electrodes of a general multilayer ceramic capacitor may be used.

A first composite resin paste including a first conductive powder may be applied to an outer side of the first and second electrode layers. The first composite resin paste may include the first conductive powder and a base resin, and the first conductive powder may include at least one of copper and silver.

The base resin may be an epoxy resin which is a thermosetting resin.

Next, a second composite resin paste may be applied to the first composite resin paste. The second composite resin paste may include a second conductive powder and a base resin, and the second conductive powder may include nickel (Ni).

The first and second composite resin pastes may be cured to form first and second composite resin layers.

Further, the plated layer 134 may be formed on the second composite resin layer.

The plated layer may include tin, and the intermetallic compound 40 may be formed between the second composite resin layer and the plated layer.

The intermetallic compound 40 in the plated layer 134 needs to have a thickness of 1 nm to 8 nm. In order to form the intermetallic compound 40 having the thickness of 1 nm to 8 nm, process variables, such as a concentration of a plating solution, pH control, a plating time, and the like, may be adjusted.

Board Having Multilayer Ceramic Capacitor Mounted Thereon

Figure 5:
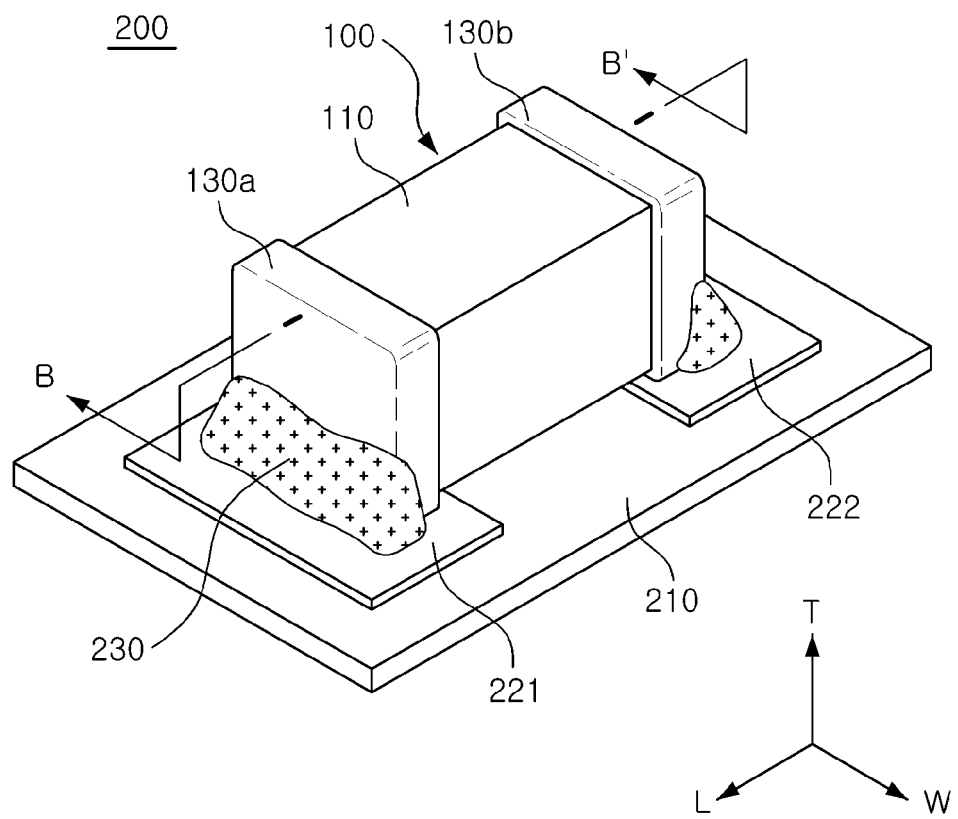
FIG. 5 is a perspective view illustrating a board having a multilayer ceramic capacitor mounted thereon according to another exemplary embodiment of the present disclosure.
Figure 6:
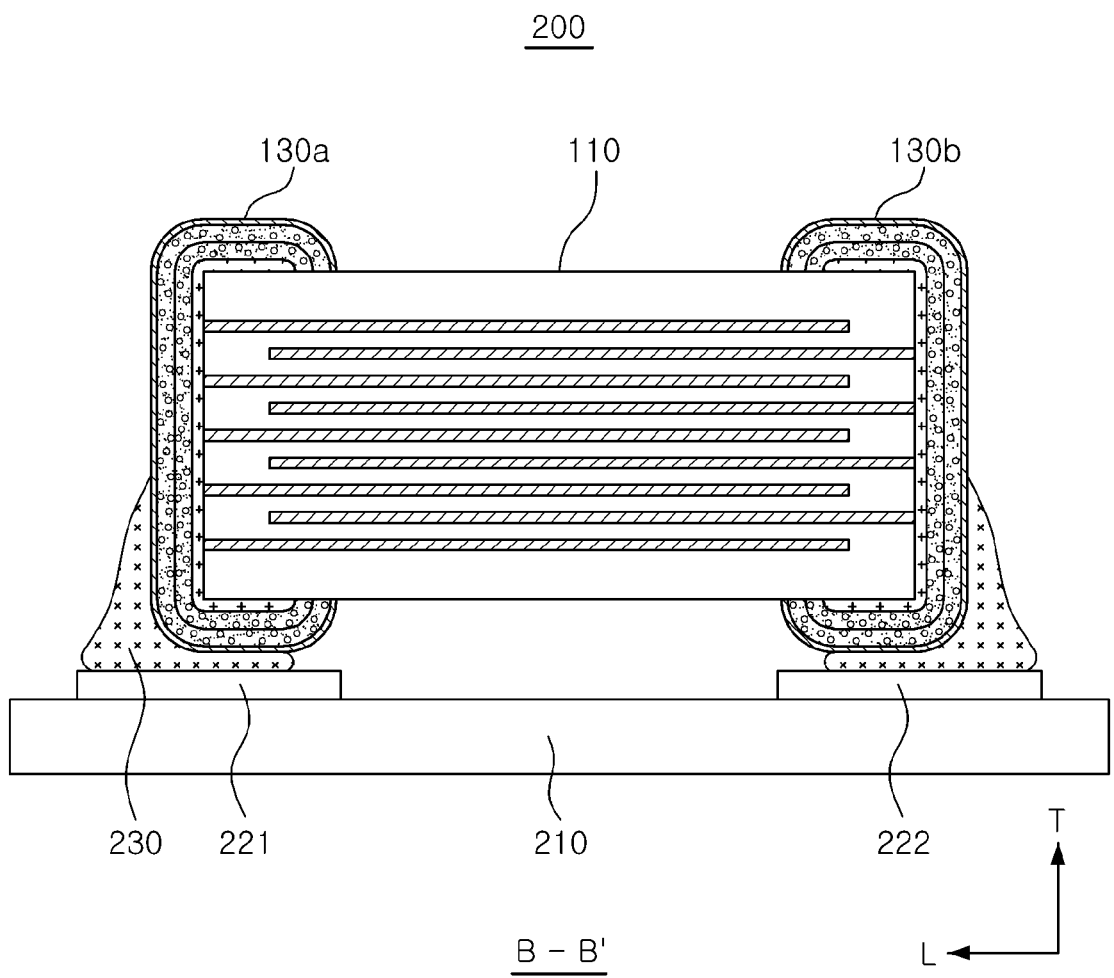
FIG. 6 is a cross-sectional view taken along line B-B' of FIG. 5.

FIG. 5 is a perspective view illustrating a board having a multilayer ceramic capacitor mounted thereon according to another exemplary embodiment of the present disclosure, and FIG. 6 is a cross-sectional view taken along line B-B' of FIG. 5.

Referring to FIGS. 5 and 6, a board 200 having a multilayer ceramic capacitor mounted thereon according to the exemplary embodiment of the present disclosure may include a printed circuit board 210 having first and second electrode pads 221 and 222 disposed thereon; solder 230 disposed on the first and second electrode pads 221 and 222; and a multilayer ceramic electronic part 100 mounted on the printed circuit board, wherein the multilayer ceramic capacitor may include a ceramic body including dielectric layers and internal electrodes, an electrode layer disposed on an outer surface of the ceramic body and electrically connected to the internal electrodes, a first composite resin layer disposed on the electrode layer and including a first conductive powder, and a second composite resin layer disposed on the first composite resin layer and including a second conductive powder different from the first conductive powder.

Since a description of the multilayer ceramic capacitor 100 mounted on the printed circuit board 210 according to the present embodiment is overlapped with the description of the multilayer ceramic capacitor according to the above-described embodiment, Details thereof will be omitted.

As set forth above, according to exemplary embodiments of the present disclosure, a multilayer ceramic capacitor having high reliability by reducing an interface separation between layers of external electrode, a manufacturing method thereof, and a board having the same mounted thereon may be provided.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic capacitor, comprising:
   a ceramic body including dielectric layers and internal electrodes;
   an electrode layer disposed on an outer surface of the ceramic body and electrically connected to the internal electrodes;
   a first composite resin layer disposed on the electrode layer and including a first conductive powder; and
   a second composite resin layer disposed on the first composite resin layer and including a second conductive powder different from the first conductive powder.

2. The multilayer ceramic capacitor of claim 1, wherein the first conductive powder includes at least one of copper (Cu) and silver (Ag).

3. The multilayer ceramic capacitor of claim 1, wherein the second conductive powder includes nickel (Ni).

4. The multilayer ceramic capacitor of claim 1, wherein the first composite resin layer and the second composite resin layer further include a thermosetting resin.

5. The multilayer ceramic capacitor of claim 4, wherein the thermosetting resin includes an epoxy resin.

6. The multilayer ceramic capacitor of claim 1, further comprising a plated layer formed on the second composite resin layer.

7. The multilayer ceramic capacitor of claim 6, wherein the plated layer includes tin (Sn).

8. The multilayer ceramic capacitor of claim 6, further comprising an intermetallic compound formed in a region in which the second composite resin layer and the plated layer contact.

9. The multilayer ceramic capacitor of claim 8, wherein the intermetallic compound is formed by a reaction between the second conductive powder and a metal included in the plated layer.

10. The multilayer ceramic capacitor of claim 8, wherein the intermetallic compound has a thickness of 1 nm to 8 nm.

11. A method of manufacturing a multilayer ceramic capacitor, the method comprising:
    preparing a plurality of ceramic green sheets;
    forming internal electrode patterns on the ceramic green sheets;
    forming a ceramic body including dielectric layers and internal electrodes by stacking and sintering the ceramic green sheets having internal electrode patterns formed thereon;
    forming an electrode layer on an outer surface of the ceramic body to be electrically connected to the internal electrodes;
    applying a first composite resin paste including a first conductive powder to the electrode layer;
    applying a second composite resin paste including a second conductive powder different from the first conductive powder to the first composite resin paste; and
    forming a first composite resin layer and a second composite resin layer by curing the first composite resin paste and the second composite resin paste.

12. A board having a multilayer ceramic capacitor mounted thereon, the board comprising:
    a printed circuit board having first and second electrode pads disposed thereon; and
    a multilayer ceramic capacitor mounted on the printed circuit board,
    wherein the multilayer ceramic capacitor includes:
    a ceramic body including dielectric layers and internal electrodes;
    an electrode layer disposed on an outer surface of the ceramic body and electrically connected to the internal electrodes;
    a first composite resin layer disposed on the electrode layer and including a first conductive powder; and
    a second composite resin layer disposed on the first composite resin layer and including a second conductive powder different from the first conductive powder.

* * * * *